US 10,637,788 B2

(12) United States Patent
Zeng

(10) Patent No.: US 10,637,788 B2
(45) Date of Patent: Apr. 28, 2020

(54) STABILITY OF DELAY-BASED CONGESTION CONTROL IN A COMPUTER NETWORK USING AN ALPHA-BETA FILTER AND ROUND-TRIP-TIME PREDICTOR

(71) Applicant: International Business Machines Corporation, Armonk, NY (US)

(72) Inventor: Shuo Zeng, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 16/019,093

(22) Filed: Jun. 26, 2018

(65) Prior Publication Data

US 2019/0394137 A1 Dec. 26, 2019

(51) Int. Cl.
*H04L 12/841* (2013.01)
*H04L 12/825* (2013.01)
*H04L 12/801* (2013.01)

(52) U.S. Cl.
CPC ............ *H04L 47/283* (2013.01); *H04L 47/11* (2013.01); *H04L 47/12* (2013.01); *H04L 47/25* (2013.01)

(58) Field of Classification Search
CPC . H04L 47/11; H04L 47/12; H04L 47/25–266; H04L 47/286; H04L 2012/5678
See application file for complete search history.

(56) References Cited

U.S. PATENT DOCUMENTS

| | | | |
|---|---|---|---|
| 7,020,714 B2* | 3/2006 | Kalyanaraman | H04L 12/18 370/231 |
| 7,839,859 B2* | 11/2010 | Kim | H04L 43/08 370/394 |
| 7,974,195 B2 | 7/2011 | Jin et al. | |
| 8,085,781 B2 | 12/2011 | Munson et al. | |
| 8,214,707 B2 | 7/2012 | Munson et al. | |
| 8,514,715 B2 | 8/2013 | Jin et al. | |

(Continued)

FOREIGN PATENT DOCUMENTS

EP 2238719 A1 10/2010

OTHER PUBLICATIONS

Karn et al., "Improving Round-Trip Time Estimates in Reliable Transport Protocols," ACM Transactions on Computer Systems, vol. 9, No. 4, Nov. 1991, pp. 364-373. (Year: 1991).*

(Continued)

*Primary Examiner* — Asad M Nawaz
*Assistant Examiner* — Thomas R Cairns
(74) *Attorney, Agent, or Firm* — Brown & Michaels, PC; Michael O'Keefe

(57) ABSTRACT

A stable transfer over a network between a sender computer and a receiver computer is achieved by minimizing the feedback delay in the input signals because studies show that global stability is valid under the assumption of zero feedback delay. Future congestion in the network from the current delay measurement can be predicted and the processed signal fed back into the rate controller (RC) to achieve near-zero feedback delay condition. By optimizing data transfer between a sender computer and a device or receiver computer across a packet-switched network at a data rate, stability of the network and overall performance of the network is improved, and persistent queueing delay minimized.

18 Claims, 10 Drawing Sheets

(56) References Cited

U.S. PATENT DOCUMENTS

| | | | |
|---|---|---|---|
| 8,625,622 B2* | 1/2014 | Dukkipati | H04L 1/0002 370/412 |
| 8,719,443 B2 | 5/2014 | Xu et al. | |
| 8,996,945 B2 | 3/2015 | Munson et al. | |
| 9,667,545 B2 | 5/2017 | Xu et al. | |
| 2006/0050640 A1 | 3/2006 | Jin et al. | |
| 2006/0159098 A1 | 7/2006 | Munson et al. | |
| 2014/0181610 A1 | 6/2014 | Munson et al. | |
| 2016/0323167 A1 | 11/2016 | Osuga | |

OTHER PUBLICATIONS

Mittal et al. "TIMELY: RTT-based Congestion Control for the Datacenter", ACM Special Interest Group on Data Communication; Aug. 2015.

C. Jin, D. Wei, S. H. Low, J. Bunn, H. D. Choe, J. C. Doylle,H. Newman, S. Ravot, S. Singh, F. Paganini, G. Buhrmaster, L Cottrell,O. Martin, and W chun Feng, "Fast tcp: from theory to experiments," IEEE Network, vol. 19, pp. 4-11, Jan. 2005.

D. X. Wei, C. Jin, S. H. Low, and S. Hegde, "Fast tcp: Motivation, architecture, algorithms, performance," IEEE/ACM Transactions on Networking, vol. 14, pp. 1246-1259, Dec. 2006.

J. Wang, A. Tang, and S. H. Low, "Local stability of fast tcp," in 2004 43rd IEEE Conference on Decision and Control (CDC) (IEEE Cat. No. 04CH37601), vol. 1, pp. 1023-1028 vol. 1, Dec. 2004.

J. Wang, D. X. Wei, J.-Y. Choi, and S. H. Low, Modelling and Stability of Fast TCP, pp. 331-356. New York, NY: Springer New York, 2005.

J.-Y. Choi, K. Koo, J. S. Lee, and S. H. Low, "Global stability of fast tcp in single-link single-source network," in Proceedings of the 44th IEEE Conference on Decision and Control, pp. 1837-1841, Dec. 2005.

L. Tan, W. Zhang, and C. Yuan, "On parameter tuning for fast tcp," IEEE Communications Letters, vol. 11, pp. 458-460, May 2007.

J.-Y. Choi, K. Koo, D. X. Wei, J. S. Lee, and S. H. Low, "Global exponential stability of fast tcp," in Decision and Control, 2006 45th IEEE Conference on, pp. 639-643, IEEE, 2006.

A. Papachristodoulou, "Global stability analysis of a tcp/aqm protocol for arbitrary networks with delay," in 2004 43rd IEEE Conference on Decision and Control (CDC) (IEEE Cat. No. 04CH37601), vol. 1, pp. 1029-1034 vol. 1, Dec. 2004.

A. Tang, K. Jacobsson, L. L. H. Andrew, and S. H. Low, "An accurate link model and its application to stability analysis of fast tcp," in IEEE INFOCOM 2007—26th IEEE International Conference on Computer Communications, pp. 161-169, May 2007.

Z. Wang and F. Paganini, "Global stability with time-delay of a primaldual congestion control," in 42nd IEEE International Conference on Decision and Control (IEEE Cat. No. 03CH37475), vol. 4, pp. 3671-3676 vol. 4, Dec. 2003.

Y. Zhang, S.-R. Kang, and D. Loguinov, "Delayed stability and performance of distributed congestion control," SIGCOMM Comput. Commun. Rev., vol. 34, pp. 307-318, Aug. 2004.

V. Jacobson, "Congestion avoidance and control," in Symposium Proceedings on Communications Architectures and Protocols, SIGCOMM '88, (New York, NY, USA), pp. 314-329, ACM, 1988.

R. Ludwig and K. Sklower, "The eifel retransmission timer," SIGCOMM Comput. Commun. Rev., vol. 30, pp. 17-27, Jul. 2000.

R. Ludwig and R. H. Katz, "The eifel algorithm: Making tcp robust against spurious retransmissions," SIGCOMM Comput. Commun. Rev., vol. 30, pp. 30-36, Jan. 2000.

M. Natrella, NIST/SEMATECH e-Handbook of Statistical Methods. NIST/SEMATECH, Jul. 2010.

Y. Bar-Shalom, X. R. Li, and T. Kirubarajan, Estimation with applications to tracking and navigation: theory algorithms and software. John Wiley & Sons, 2004.

R. E. Kalman et al., "A new approach to linear filtering and prediction problems," Journal of basic Engineering, vol. 82, No. 1, pp. 35-45, 1960.

P. R. Kalata, "The tracking index: A generalized parameter for and target trackers," IEEE Transactions on Aerospace and Electronic Systems, vol. AES-20, pp. 174-182, Mar. 1984.

R. J. Hyndman and G. Athanasopoulos, Forecasting: principles and practice. OTexts, 2014.

S. H. Low, F. Paganini, and J. C. Doyle, "Internet congestion control," IEEE control systems, vol. 22, No. 1, pp. 28-43, 2002.

* cited by examiner

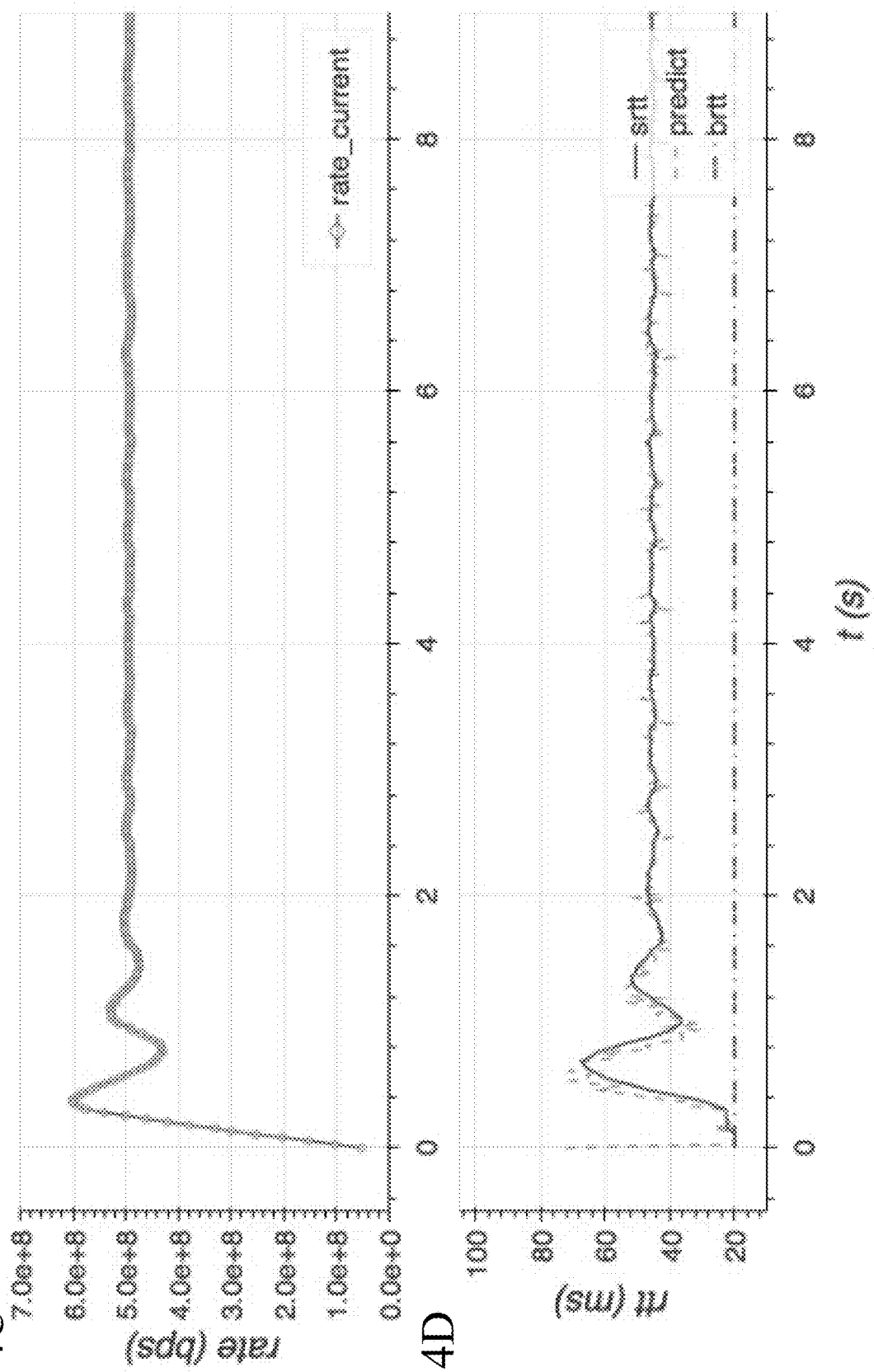

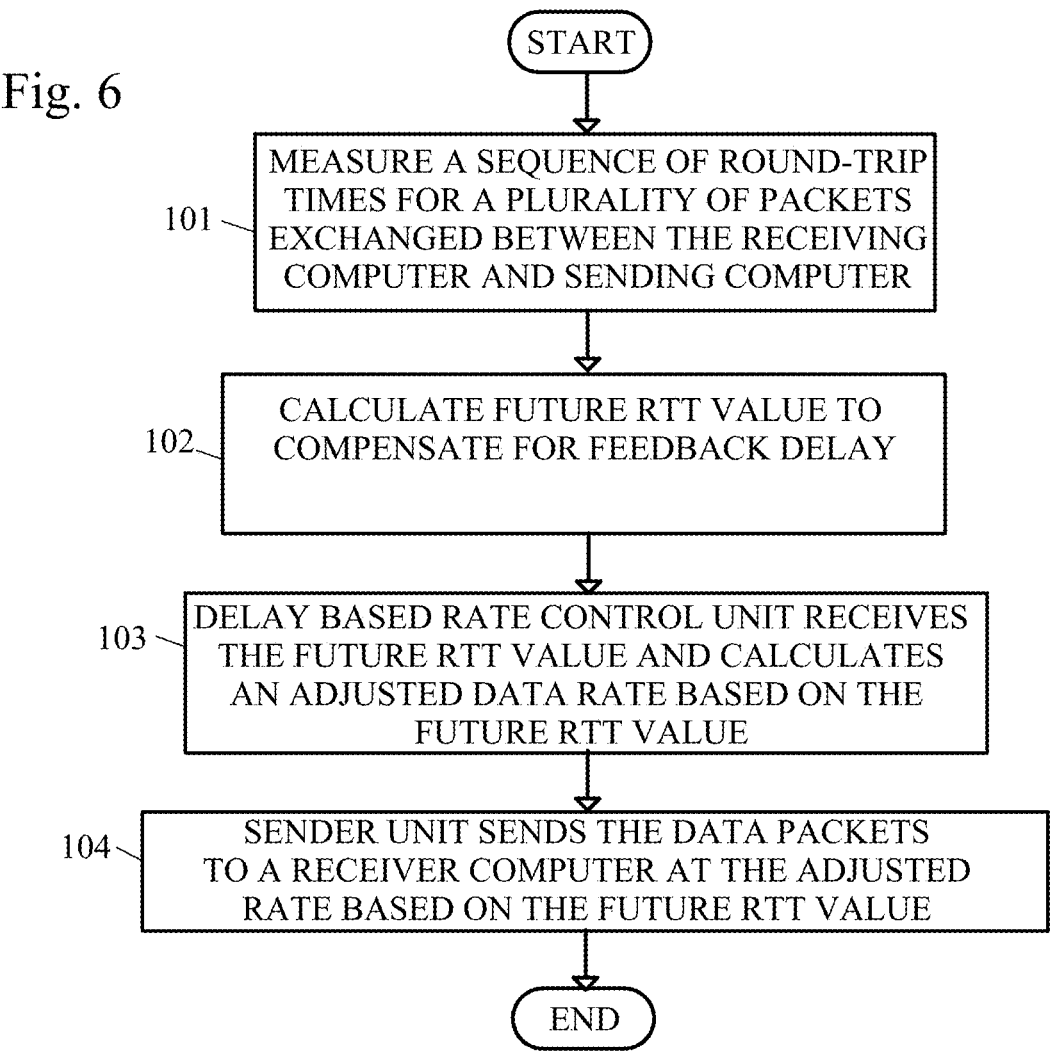

STABILITY OF DELAY-BASED CONGESTION CONTROL IN A COMPUTER NETWORK USING AN ALPHA-BETA FILTER AND ROUND-TRIP-TIME PREDICTOR

BACKGROUND

The present invention relates to optimizing data flow over a packet-switched computer network, and more specifically to a method of optimizing data flow under conditions of network congestion using delay-based congestion control.

Delay-based congestion control methods have significant advantages over many of the loss-based mechanisms in Transmission Control Protocol (TCP). Most loss-based congestion detection systems do not distinguish between random loss events and those caused by congestion. Under the additive-increase-multiplicative-decrease (AIMD) congestion control paradigm, random loss events often result in network underutilization. Single-bit loss information does not directly measure congestion. On a modern network with ample packet buffers between transfer nodes, congestion can accumulate to a significant level at the link bottleneck before a single packet is dropped. In contrast, delay-based congestion measurements detect congestion as it happens and can be less impacted by random events.

One of the most prominent delay-based congestion control mechanisms is "FAST TCP", which provides a framework for building a high-speed transfer protocol. In theory, FAST TCP offers many benefits (besides high speed transfer), such as fairness and stability. However, its behavior in the real-world network environment is not so clear, especially in the presence of feedback delay.

Feedback delay is the lag between the present network congestion condition and the input signal for the rate control unit. Such feedback delay can arise from congestion itself, processing delay due to hardware or implementation artifacts etc. The lag can retard the rate control response to congestion, leading to the oscillation of data flow rate, excessive queueing delay and packet loss, hence destabilizing transfers. More significant repercussions can be expected on a large scale network. Many efforts have been devoted to deriving analytical restrictions on the parameters to tune the algorithm in order to achieve stability. Most studies have focused on the local stability conditions with zero feedback delay or other simplification of a feedback model. It has reached the consensus that that the feedback delay is responsible for the instability, however, whether or not such theoretical models resemble realistic behavior in the real world applications are still open to questions given the complex activities of modern network. Deriving a robust stability condition beyond zero feedback-delay approximation is still a challenging problem.

Multiple factors can contribute to feedback delay during a transfer. Two most important sources of the feedback delay are: 1) feedback delay due to the communication between client and server during measurement and rate-update, and 2) the numerical artifact introduced in signal filtering.

For an end-to-end protocol, the client and server constantly exchange packets to measure the round-trip-time (RTT), which are used to calculate the queueing delay. This measurement, by definition, is a delayed signal and it always lags behind the instantaneous queueing delay, which is the queueing delay a packet would experience if the packet enters the network at the moment. The difference between the measured and instantaneous queueing delay varies in time and is apparently greater as congestion increases. Depending on the implementation of the protocol, additional feedback delay can be introduced when syncing the sender and receiver for a rate-update. For example, if the RTT is measured by the receiver and the rate is applied at the sender, then the sender must wait for the receiver to transmit the rate-update data back to sender, adding at least a one-way propagation time to the total feedback delay.

Raw RTT measurements are usually filtered to reduce noise, but this filtered data may misrepresent the trend of the original measurements, distorting the input for congestion control. Exponential moving average methods have been widely accepted in the development of TCP, including the fixed-weight Jacobson's filter and dynamic-weight exponential filters such as the one in FAST TCP and Eifel algorithm. These methods require only the latest measurement to update the result, which saves memory and is easy to implement. Though the RTT data can be smoothed by averaging over time, a moving average produces artificial lag when the signal is trending.

SUMMARY

According to one embodiment of the present invention, a method of optimizing data transfer between a sender computer and a receiver computer across a packet-switched network at a data rate is disclosed. The method comprising the steps of: measuring a sequence of round-trip times for a plurality of packets exchanged between the sender computer and the receiver computer; deriving a filtered round-trip time by applying an alpha-beta filter to the plurality of measured round-trip times; deriving a future round-trip time from the filtered round-trip time using a predictor; and adjusting the data rate in accordance with the future round-trip time.

According to another embodiment, a computer program product for optimizing data transfer between a sender computer and a receiver computer across a packet-switched network at a data rate is disclosed. The receiver computer and the sender computer each comprising at least one processor, one or more memories, one or more computer readable storage media, the computer program product comprising a computer readable storage medium having program instructions embodied therewith, the program instructions executable by the sender or receiver computer to perform a method comprising: measuring, by the sender or receiver computer, a sequence of round-trip times for a plurality of packets exchanged between the sender computer and the receiver computer; deriving, by the sender or receiver computer, a filtered round-trip time by applying an alpha-beta filter to the plurality of measured round-trip times; deriving, by the sender or receiver computer, a future round-trip time from the filtered round-trip time using a predictor; and adjusting, by the sender or receiver computer, the data rate in accordance with the future round-trip time.

According to another embodiment, a computer system for optimizing data transfer between a sender computer and a receiver computer across a packet-switched network at a data rate is disclosed. The sender or receiver computer comprising at least one processor, one or more memories, one or more computer readable storage media having program instructions executable by the computer to perform the program instructions comprising: measuring, by the sender or receiver computer, a sequence of round-trip times for a plurality of packets exchanged between the sender computer and the receiver computer; deriving, by the sender or receiver computer, a filtered round-trip time by applying an alpha-beta filter to the plurality of measured round-trip times; deriving, by the sender or receiver computer, a future round-trip time from the filtered round-trip time using a predictor; and adjusting, by the sender or receiver computer, the data rate in accordance with the future round-trip time.

BRIEF DESCRIPTION OF THE DRAWINGS

FIG. 4C shows a graph of rate (bps) versus time (s) indicating current transfer rate performance in a network with a Bezier predictor.

FIG. 4D shows a graph of RTT (ms) versus time (s) indicating transfer performance near equilibrium in a network with a Bezier predictor.

FIG. 6 shows a flow diagram of the steps of the method of FIG. 5.

DETAILED DESCRIPTION

The present invention specifically targets at the aforementioned instability issue of the delay-based congestion control in the presence of feedback delay, providing a universal method to improve the transfer stability and performance. In an embodiment of the present invention, the feedback delay in the congestion input signal is minimized by performing an Alpha-Beta filter and predicting future congestion signals. Through these procedures, feedback delay can be largely reduced and hence stabilize the transfer. In an embodiment of the invention, the Alpha-Beta filter and round-trip-time predictor are implemented within the framework of FASP. It should be clear to those who are skilled in field of such art that the current invention is not limited to the FASP implementation but can be applied to any delay-based congestion control.

In an embodiment of the present invention, a stable transfer over a network between a sender computer and a receiver computer is achieved by minimizing the feedback delay in the input signals because global stability is valid under zero feedback delay. Future congestion in the network from the current delay measurement can be predicted and the processed signal fed back into the rate controller (RC) to achieve near-zero feedback delay. Under such conditions, the delay-based rate-controller can adjust to the available bandwidth quickly and maintains maximum throughput. Compared to the conventional FASP rate-controller, the addition of an AB filter and RTT predictor reduces the oscillation of the rate and queue significantly and the packet loss is also minimized Reducing packet loss and oscillation of the rate and queue significantly increases stability of the network and overall performance of the network is improved.

In an embodiment of the present invention, the optimization of a data transfer between a sender computer and a receiver computer across a packet-switched network at a data rate can occur on the receiver side or the sender side. The calculation unit preferably resides where the raw RTT measurements take place. In one embodiment, the AB filter and RTT predictor are implemented on the receiver computer or receiver side. In an alternate embodiment, the AB filter and RTT predictor are implemented on the sender computer or sender side.

Figure 1:
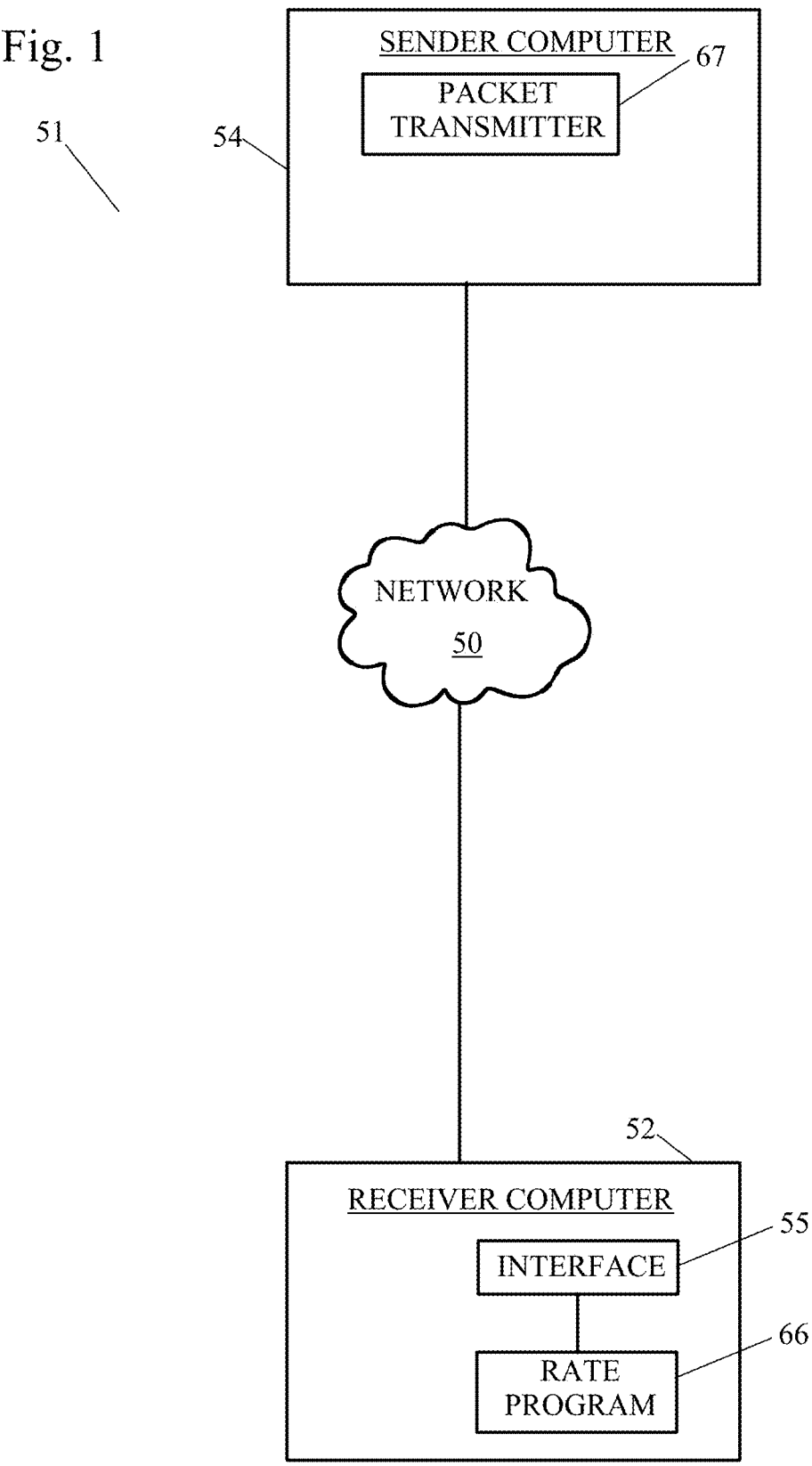
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, receiver computer 52 and a sender computer 54 connect to network 50. In other exemplary embodiments, network data processing system 51 may include additional receiver computers, storage devices or repositories, sender computers, and other devices not shown.

The receiver computer 52 may contain an interface 55, which may accept commands and data entry from a user. The interface can be, for example, a command line interface, a graphical user interface (GUI), a natural user interface (NUI) or a touch user interface (TUI). The receiver computer 52 preferably contains a rate program 66. The rate program 66 determines future congestion in the network from the current delay measurement and can feed the processed signal into the rate controller (RC) to achieve near-zero feedback delay for a stable transfer of data over a network between a sender and a receiver of the network 50. The rate program 66 preferably includes an Alpha-Beta filter, RTT predictor and delay-based rate controller.

In the depicted example, sender computer 54 provides information, such as boot files, operating system images, and applications to the receiver computer 52. Receiver computer 54 can compute the information locally or extract the information from other computers on network 50. The sender computer 54 preferably includes a packet transmitter 67, which injects the data packet based on the rate calculated by the rate program 66.

Program code and programs such as rate program 66 may be stored on at least one of one or more computer-readable tangible storage devices, on at least one of one or more portable computer-readable tangible storage devices connected to network 50, or may be downloaded to a receiver computer 52 or sender computer 54, for use. For example, program code and programs such as rate program 66 may be stored on at least one of one or more storage devices on sender computer 54 and downloaded to receiver computer 52 over network 50 for use. Alternatively, sender computer 54 can be a web server, and the program code, and programs such as rate program 66 may be stored on at least one of the one or more storage devices on sender computer 54 and accessed receiver computer 52 or other sender computers 54. In other exemplary embodiments, the program code, and programs such as rate program 66 may be stored on at least one of one or more computer-readable storage devices on receiver computer 52 or distributed between two or more servers. Rate program 66 can be written in various programming languages including low-level, high-level, object-oriented or non object-oriented languages. Alternatively, the functions of a rate program 66 can be implemented in whole or in part by computer circuits and other hardware (not shown).

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Though many studies suggest the FAST TCP is stable under the zero-feedback-delay assumption, this oversimplification may lead to unrealistic stability dynamics. The purpose of the method in an embodiment of the present invention is to minimize feedback delay by processing the RTT measurement so that global stability of a network can be achieved. This allows any FAST TCP based applications to achieve transfer stability and maximize throughput. The method of an embodiment of the present invention first minimizes the feedback delay and noise of the raw RTT measurement by introducing the Alpha-Beta filter (AB filter) to the RTT measurements. Finally, the method uses extrapolation methods to predict future RTT and adjust the transfer rate so that feedback delay can be minimized Alpha-Beta Filter Alpha-Beta (AB) filters were originally designed to track the position of a moving object from noisy measurements, and have been used extensively in target tracking and navigation applications. The main difference between the AB filter and moving average approach is that the AB filter uses velocity and acceleration in its kinetic model to account for a trending signal, whereas a simple moving average only reduces random noise from average value.

An AB filter is ideal for processing RTT measurement as it constantly monitors the trend/derivative. Despite being popular in a different field, the AB filter has never been used in a network congestion control algorithm, largely due to the fact that the network is dominated by loss-based TCP traffic, where a precise RTT filtering technique is rarely needed.

The AB filter is derived from the optimal linear filter, the Kalman filter, yet it is much simpler computationally. Similar to the single exponential filter, the AB filter has an iterative form that requires only the latest event for each iteration. Given the raw input, RTT sequence $\{z_k\}$, measurement interval T, the AB filter estimates the smoothed signal $x_k$ and its derivative $\eta_k$. For each iteration, it estimates the value of the next measurement by making a linear prediction, $$x_k = x_{k-1} + \eta_{k-1} T$$

$$\eta_k = \eta_k - 1 \tag{1.1}$$

The prediction was corrected by compounding it with the latest measurement $z_k$ using the smoothing factors Alpha ($\alpha$) and Beta ($\beta$), for the two states of position $x_k$ and velocity $\eta_k$.

$$\Delta = z_k - x_k$$

$$x_k = x_k + \alpha(\Delta)$$

$$\eta_k = \eta_k + \beta(\Delta/T) \tag{1.2}$$

In addition to the standard procedure of AB filter, the Jacobson's algorithm was used to evaluate the mean variation of the RTT and its derivative, $$v_k^{(x)} = v_{k-1}^{(x)} + \beta(|\Delta| - v_{k-1}^{(x)}) \tag{1.3}$$

$$v_k^{(\eta)} = v_{k-1}^{(\eta)} + \alpha\left(\left|\frac{\Delta}{T} - \eta_{k-1}\right| - v_{k-1}^{(\eta)}\right)$$

Using the Kalata relationship, $\alpha$ and $\beta$ are evaluated. A tracking index $\Lambda$ is defined in terms of the estimated system error $\sigma_w$, the measurement noise error $\sigma_n$, and measurement interval T, $$\Lambda = \frac{T^2 \sigma_w}{\sigma_n} \tag{1.4}$$

In the current implementation, $\sigma_w$ is empirically determined as $\sqrt{0.0015(v_k^{(\eta)})^2 + (v_k^{(x)})^2}$ and $\sigma_n$ is 1 ms, the measurement of accuracy. The interval T can be evaluated by the incoming packet rate. Larger tracking rate $\Lambda$ values indicate greater sensitivity to variations in RTT and a less smooth RTT trend. The optimal value for $\alpha$ and $\beta$ can be calculated analytically, $$r = \frac{4 + \Lambda - \sqrt{8\Lambda + \Lambda^2}}{4} \tag{1.5}$$

$$\alpha = 1 - r^2$$

$$\beta = 2(2 - \alpha) - 4\sqrt{1 - \alpha}$$

Equation (1.5) yields constraints $0<\alpha<1$ and $0<\beta<2$. To increase stability, $\beta$ can be further restricted to less than 0.8 because noise is amplified when $\beta>1$. Solving Equation (1.5) with the condition $\beta<0.8$ yields a tracking rate of $\Lambda<2.17661$.

Figure 2:
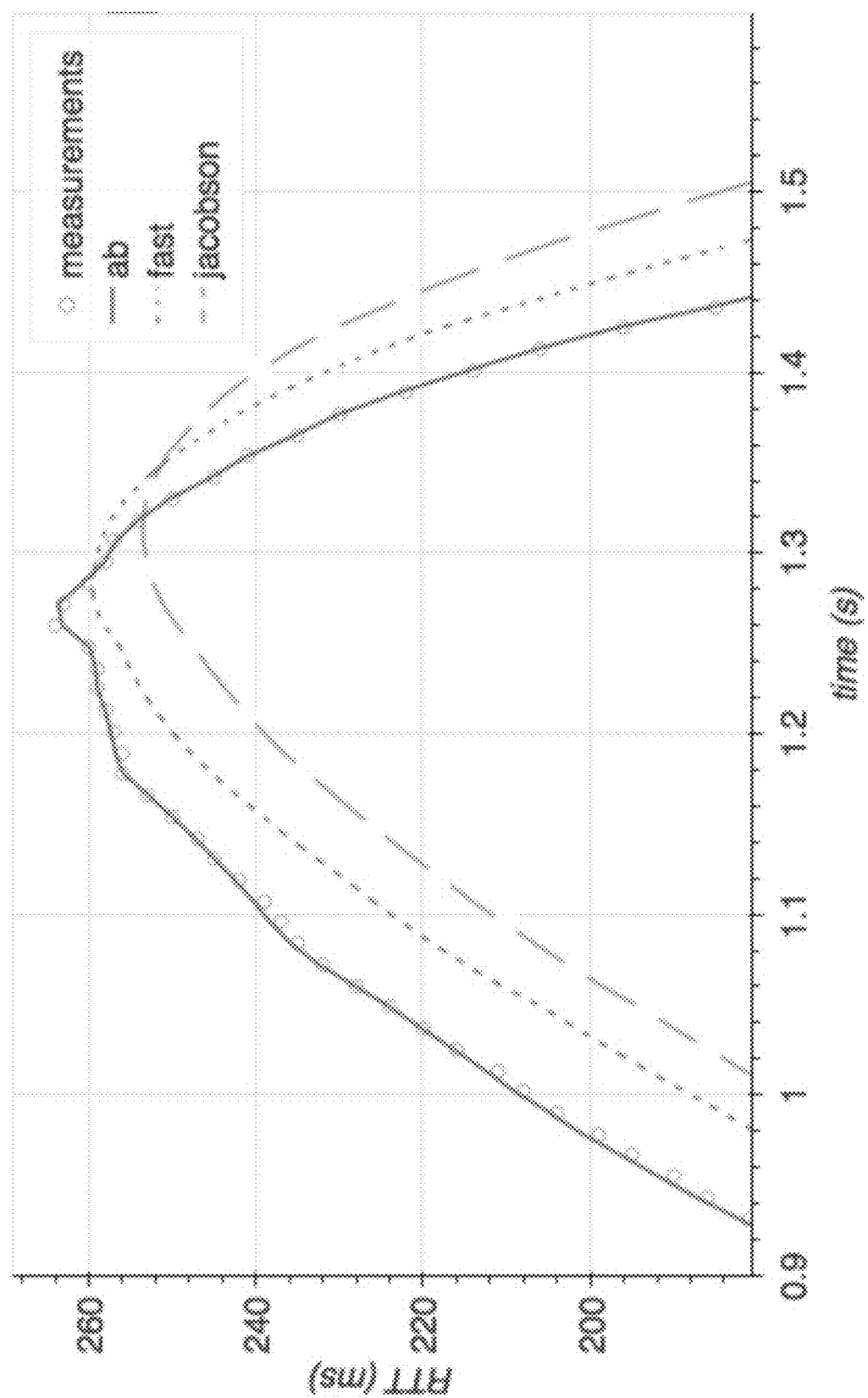
FIG. 2 shows performance of AB filters, FAST filters and Jacobson filters on a set of raw RTT measurements during congestion in a network linke of 1 Mbps bandwidth.

In comparison to Jacobson's filter and the FAST filter, the AB filter is superior in terms of smooth capability, responsiveness and accuracy. FIG. 2 shows the performance of these filters on a set of raw RTT measurements during congestion. These data sets were generated from FASP transfer in a network with a bandwidth of 1 Mbps, which translated to an incoming packet rate of 83 packets per second.

The AB filter has proven to be a robust solution. Because the AB filter accounts for the packet rate when it evaluates the smoothing factors, the filtered signals in both low and high bandwidth cases show consistent behavior. More importantly, the smoothed signal does not deviate from the original data and produces minimal feedback delay.

To put it into perspective, FIG. 2 shows an example of filtering data at a bandwidth of 1 Mbps, using the AB filter of the method (solid line), compared with a FAST filter (dotted line) and Jacobson's filter (dashed line).

At t=1.10 s, the raw measurement indicates the RTT for the AB filter is about 240 ms, whereas the smoothed RTT (sRTT) by Jacobson's filter reaches this value at t=1.20 s, which indicates a 100 ms lag due to the moving average. The FAST filter produces a smaller lag, about 50 ms, but the issue remains. The AB filter always follows the main trend of the raw signal while producing a smooth curve at the same time. Not only is feedback delay reduced, but accurate inputs are provided for the RTT prediction model of an embodiment of the present invention.

Round-Trip-Time Predictor

To synthesize a signal that has zero feedback delay, a relationship is derived between the measured queueing delay $\tilde{q}(t)$ and the instantaneous queueing delay $q(t)$, which is the delay that the packet experiences if the sender transmits the packet at t.

As discussed above, feedback delay depends on the RTT measurement and the RC. For this study, the RTT measurement and RC that are used by FASP high-speed transfer protocol were considered. In this case, RTT is measured on the receiver, and every data packet carries an RTT event. The RC unit is also on the receiver side and use the sRTT as input for periodic rate evaluation. The receiver sends updated rates to the sender, where they are applied to subsequent packet transfers. Although the example is given for the feedback delay model for FASP, the general procedure of prediction applies for all delay-based protocols.

In this example, the exact relation between the measured queuing delay $\tilde{q}(t)$ and the instantaneous queueing delay $q(t)$ should be:

$$q(t) = \tilde{q}\left(t + \frac{b}{2} + q(t)\right) \quad (1.6)$$

Wherein b is base RTT, the minimum round-trip-time due to transmission propagation without any extra delay.

Equation (1.6) indicates that the current network queueing is measured $b/2+q(t)$ later, and results in a $b/2+q(t)$ feedback delay due to the measurement itself. Note that in this example it is explicitly assumed that the backward link has no congestion and all queueing delay occurs in the forward link. In most cases, these assumptions are valid unless users perform bidirectional high-speed transfers. Additionally, the new rate needs another b/2 to reach the sender and to be applied, which yields a total feedback delay of b+q(t). Since q(t) is not directly available at any given moment, we approximate the feedback delay to be $b+\tilde{q}(t)$. The difference between the measured and instantaneous queueing delay should diminish as the transfer approaches equilibrium.

The stability of transfer was determined by incorporating Equation (1.6) into a flow-based simulation in which the RTT predictor can be tested in the absence of network effects (such as noise) or implementation conditions, and from which we derive analytical results. Based on the simulations, it was determined that the prediction distance is actually two times the currently measured RTT, $2(b+\tilde{q}(t))$, which is possibly due to the fact that the feedback delay was approximated to $b+\tilde{q}(t)$ instead of $b+q(t)$. When congestion increases in the network, q(t) responds quickly while $\tilde{q}(t)$ lags behind. Therefore, $\tilde{q}(t)$ is expected to be smaller than q(t).

Preliminary tests with FASP under real network conditions identified three RTT prediction methods for producing a future congestion value that were stable and robust: a first-order finite-difference method with three points rule (FD31), quadratic Bezier extrapolation (Bezier), and an error-trend-seasonality model (ETS). These were implemented as described below, with a prediction range limiter applied to the finite difference and Bezier.

Instead of taking raw RTT data continuously as packets arrive, the RTT predictor uses only the filtered (sRTT) values at each rate update. The update interval is $\tau=b+Q$, where Q is the target queue. We define the prediction distance h as the instance ahead of the time from present in the unit of $\tau$. The input to the predictor is a series of sRTT values $\{\ldots x_{n-2}, x_{n-1}, x_n\}$ sampled at the updated period $\tau$, where n represents each rate update in step 102 discussed below. The prediction distance is evaluated as $h=2x_n/\tau$.

Finite Difference

At each rate update $t_n$, the future value of sRTT $x(t_n+h\tau)$ can be linearly extrapolated using first order Taylor's expansion at the current time $t_n$:

$$x(t_n+h\tau)=x_n+x'(t_n)h\tau \quad (1.7)$$

with the 3-points backward difference rule, $$x'(t_n) = \left(\frac{3}{2}x_n - 2x_{n-1} + \frac{1}{2}x_{n-2}\right)/\tau \quad (1.8)$$

The combination yields, $$x(t_n + h\tau) = \left(1 + \frac{3}{2}h\right)x_n - 2hx_{n-1} + \frac{1}{2}hx_{n-2} \quad (1.9)$$

This linear prediction is more robust than the higher order polynomial prediction because the higher order terms diverged as h increased.

Bezier Extrapolation

The finite difference approach assumes that underlying times series can be approximated as a finite-order polynomial and true signals go through the given data point. It imposes a strong constraint on the extrapolation form. Therefore, the extrapolation may not necessarily reflect the actual trend of the signal. In contrast, the Bezier extrapolation does not require the polynomial curve to match the data precisely, which offers more flexibility in the model. This flexibility allows us to apply a higher order form for extrapolation.

We used a quadratic Bezier curve for extrapolation:

$$x(t_n + h\tau) = \frac{h^2}{4}x_{n-2} - h\left(1 + \frac{h}{2}\right)x_{n-1} + \left(\frac{h}{2} + 1\right)^2 x_n \quad (1.10)$$

Based on our experiments, we find second order can be effective and robust.

Prediction Range Limiter e;.4qThe finite difference and Bezier predictors do not have a bounded asymptotic limit, which could be disruptive for large prediction distances. For example, if the network is congested and the transfer link has a large buffer, the packet can be delayed in the buffer for a period that is much greater than one rate-update interval. For this reason, we restrict the prediction range to keep the predicted value from overshooting. For prediction at any desired instance x, the limited prediction range is:

$$f(x, x_{max}) = \frac{x}{1 + x^2/4x_{max}^2} \quad (1.11)$$

With this function $f(x) \to x$ near the origin, whereas $f(x) \to 4x_{max}^2/x$ asymptotically. The maximum mapped prediction distance with this function is $x_{max}$. For this example, we used $x_{max}=3.0$ for the two predictors because we used three historical data points when implementing FD31 and Bezier predictors.

Error-Trend-Seasonality (ETS) Model

The ETS model is a collection of forecasting models that have been frequently used in statistics and economics. The specific model we adopted is the non-seasonal damped additive method. Unlike FD31 and Bezier, the ETS model has inherent constraints on its asymptotic behavior. It introduces a damping factor $0<\phi<1$ in its iterative form:

$$l_n = \alpha x_n + (1 + \alpha)(l_{n-1} + \phi b_{n-1}) \quad (1.12)$$
$$b_n = \beta(l_n - l_{n-1}) + (1 - \beta)\phi b_{n-1}$$
$$x(t_n + h\tau) = l_n + \phi \frac{1 - \phi^h}{1 - \phi} b_n$$

Where:

$l_n$ and $b_n$ are intermediate factors $\alpha$ and $\beta$ are internal smoothing parameters for ETS.

Note that this iterative formula resembles the form of an AB filter, even though the values of $\alpha$, $\beta$ are different. The damping factor prevents the prediction from diverging asymptotically, therefore it does not need a range limiter. We optimized this method by using $\alpha=0.9$, $\beta=0.7$ and $\phi=0.88$ based on our experiments. Up to ten measurements are stored in memory for this predictor. Other values for $\alpha$, $\beta$, and $\phi$ may be used within the scope of the invention.

Rate Controller

The general form of a delay-based rate controller has been discussed in the prior art. In the context of an embodiment of the present invention, a rate controller takes the predicted sRTT $x'_n = x(t_n + h\tau)$ using an elected method among Equations (1.9)-(1.12). In one embodiment, a rate controller calculates a new rate as follows:

$$r_{n+1} = r_n + \gamma[QR - (x'_n - b)r_i]/x'_n \quad (1.13)$$

Where:

Q is the fixed target queue length in the unit of millisecond,

R is a fixed target rate in the unit of bit per second $\gamma$ is a constant that is smaller than 1 b is the base RTT value.

Method

Figure 5:
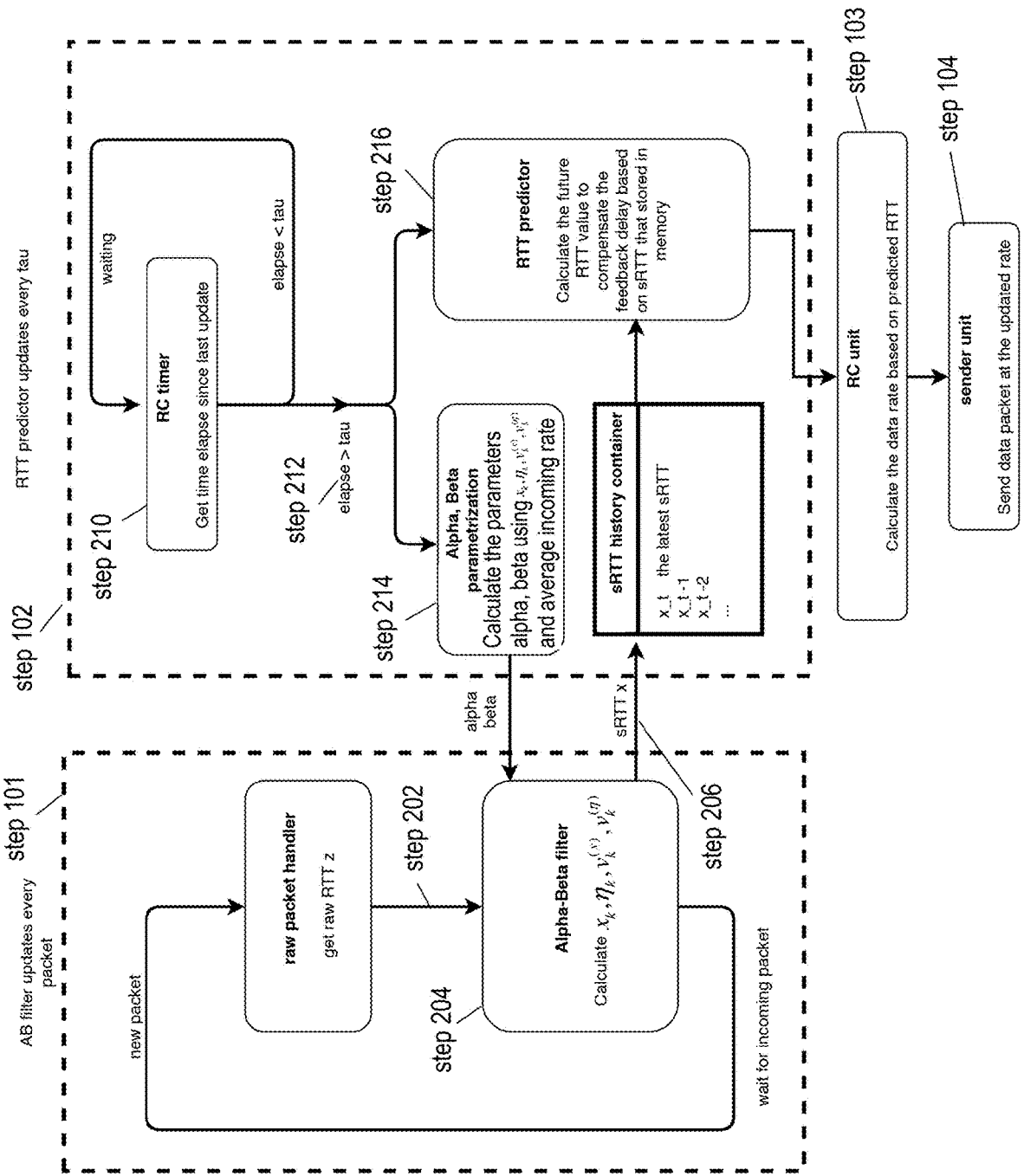
FIG. 5 is a flow diagram of a method of optimizing data transfer between a sender computer and a receiver computer across a packet-switched network at a data rate.

FIGS. 5 and 6 are flow diagrams of the method of optimizing data transfer between a sender computer and a receiver computer across a packet-switched network at a data rate. In an embodiment, the method includes an alpha-beta filter and an RTT predictor. The alpha-beta filter and the RTT predictor work in parallel to improve the data flow speed and stability. This method can be integrated into any delay-based rate-control system given the raw measurement of RTT. The RTT measurement and the rate-control unit themselves have been discussed in detail above. The paradigm in FIG. 5 only assumes that the raw RTT is provided and a final congestion signal, RTT or queue delay, is needed for the external rate control unit. In this embodiment, the method is implemented on top of FASP. In the prior art FASP, both the raw RTT measurement and the rate control calculation are carried out on the receiver side, and the rate adjustment is sent back to sender to be applied. The implementation of the current inventions resides at the receiver and bridges the raw measurement and the rate-control unit with additional process units. It should be noted that the method of the present invention can be implemented on the sender side as well, if implementation of RTT measurement and rate controller differ from FASP.

In a first step, a sequence of round-trip times for a plurality of packets exchanged between the sender computer and the receiver computer is measured, for example by the rate program 66 (step 101). It should be noted that all data packets carry timestamp information in order to calculate the RTT value. In the current embodiment, we assume the raw RTT values are provided by the raw packet handler. One implementation of raw packet handler has been discussed in detail in FASP. The sRTT are calculated by the substeps 202, 204, and 206. In step 202, the raw RTT value $z_k$ for every new packet is provided by the Raw Packet Handler, where k represents the index of incoming packets in step 101. The Raw Packet Handler pass $z_k$ to the Alpha-Beta filter 152. Next, the latest raw RTT values received by the Alpha-Beta Filter 152 are used to calculate and update $x_k$, $\eta_k$, $v_k^{(x)}$, $v_k^{(n)}$ based on the raw RTT data to determine sRTT (step 204) using Eq. (1.1)-(1.3). The sRTT values are then sampled by the RTT predictor and to the history container periodically (step 206).

Next, an RTT predictor updates for a specific time, $\tau$ to calculate a future RTT value to compensate for the feedback delay (step 102). The future RTT value is calculated through substeps 210-216.

In step 210, an RC timer obtains time $\tau$ elapsed since a last update. When the elapsed time is greater than time $\tau$ (step 212), the $\alpha$ and $\beta$ parameters are calculated using $v_k^{(x)}$, $v_k^{(n)}$ and average incoming rate (step 214), for example using Equation (1.5).

At the same time, an RTT predictor calculates the future RTT value to compensate the feedback delay based on the sRTT values stored in the sRTT history container (step 216), for example, using Equation (1.9)-(1.12). The current predicted value of x in the AB filter can be fetched by the sRTT history container. It should be noted that the sRTT history container collects $x_n$ from the AB filter periodically and not for every packet.

A delay based rate control unit receives the future RTT value and calculates an adjusted data rate based on the future RTT value (step 103), for example by the rate program 66 using Equation (1.13).

A sender unit sends the data packets to a receiver at the adjusted data rate based on the future RTT value (step 104) and the method ends. The steps of the method repeat until the transfer is finished or interrupted. It should be noted that the components present outside of the dashed lines of FIG. 5 are not part of an embodiment of the present invention and are provided for conceptual completeness.

Example

Figure 3A:
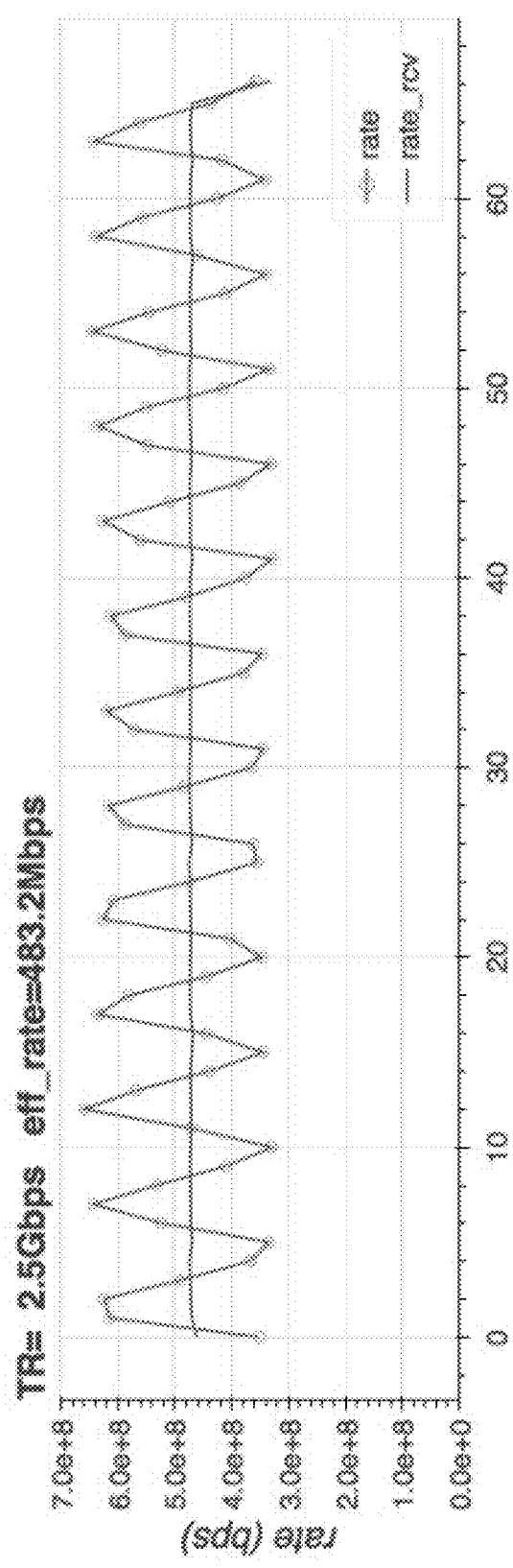
FIG. 3A shows a graph of rate (bps) versus time (s) indicating transfer performance in a network with 500 Mps bandwidth and 20 ms propagation delay in which no predictor is present in the network.
Figure 3B:
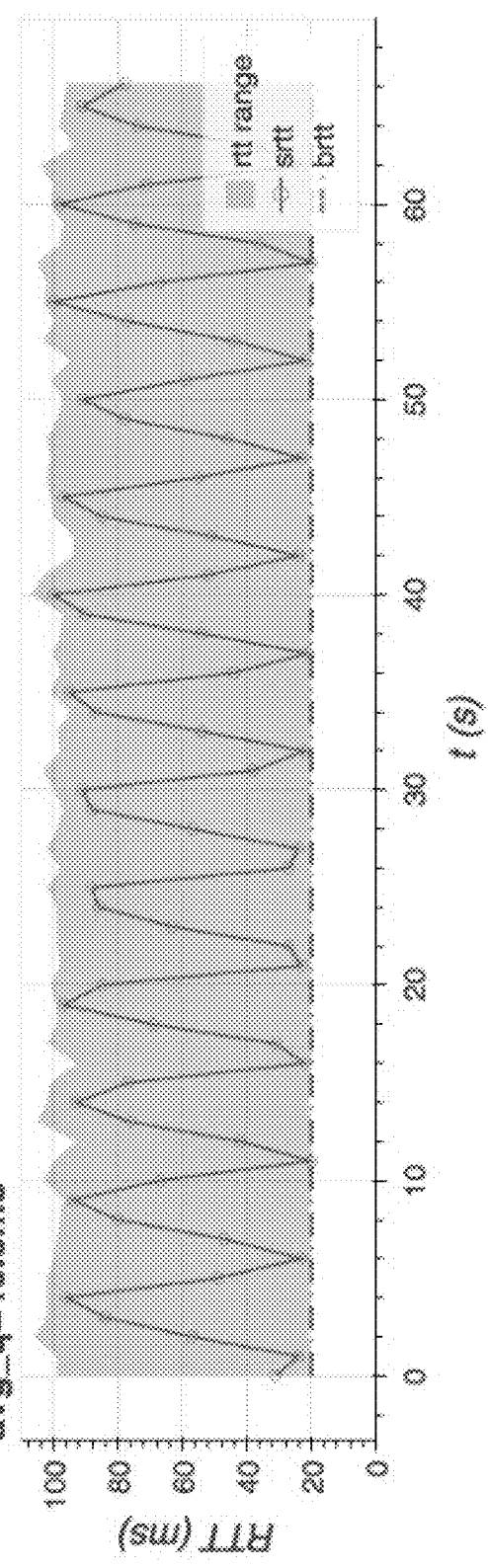
FIG. 3B shows a graph of RTT (ms) versus time (s) indicating transfer performance in a network with 500 Mps bandwidth and 20 ms propagation delay in which no predictor is present in the network.
Figure 3C:
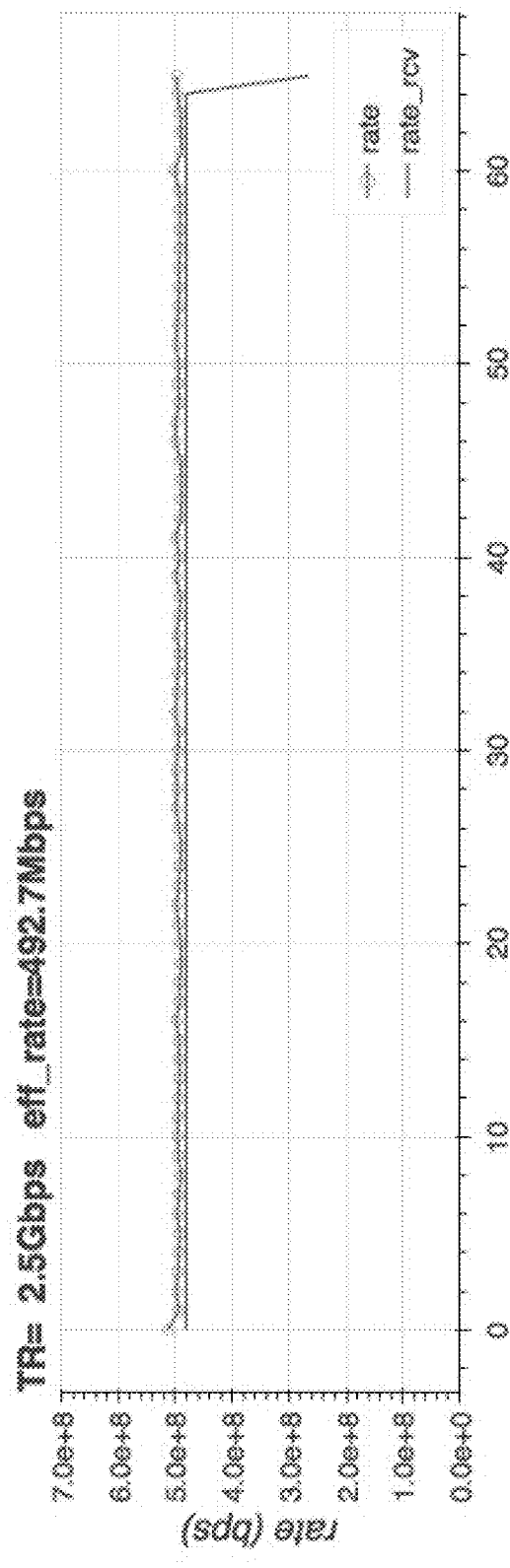
FIG. 3C shows a graph of rate (bps) versus time (s) indicating transfer performance in a network with 500 Mps bandwidth and 20 ms propagation delay in which a Bezier predictor is present in the network.
Figure 3D:
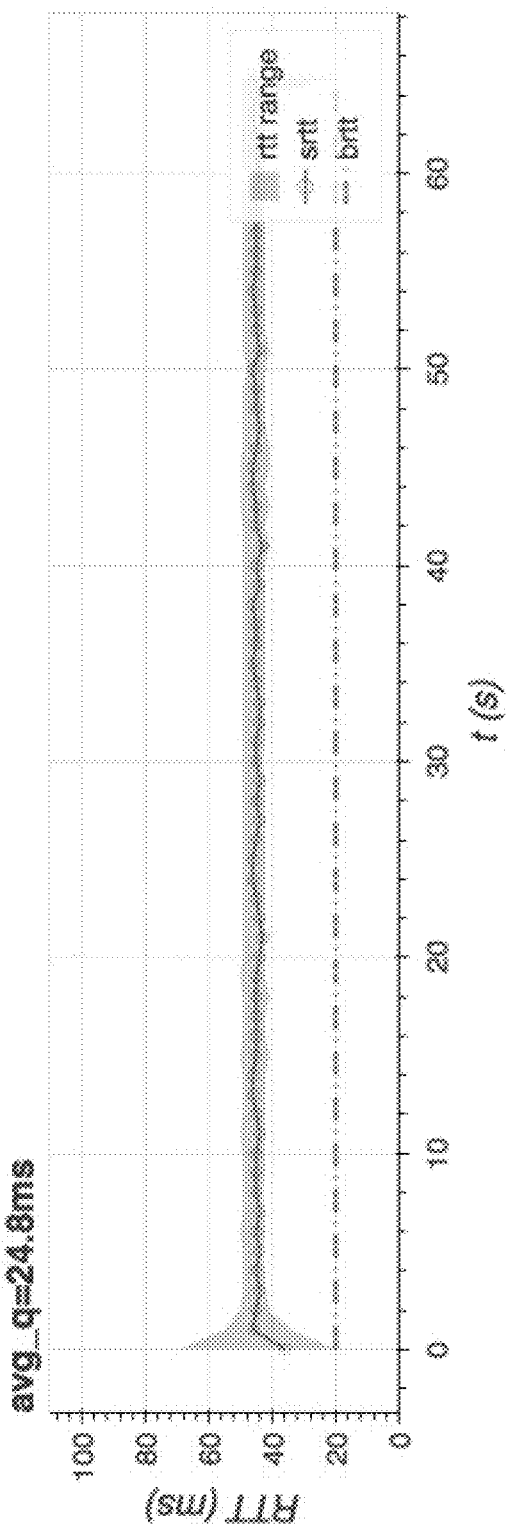
FIG. 3D shows a graph of RTT (ms) versus time (s) indicating transfer performance in a network with 500 Mps bandwidth and 20 ms propagation delay in which a Bezier predictor is present in the network.

FIGS. 3A-3B show an example of transfer performance in a network with 500 Mps bandwidth and 20 ms propagation delay without a predictor being used. FIGS. 3C-3D show an example of transfer performance in the same network with 500 Mps bandwidth and 20 ms propagation delay the method of the present invention and an associated predictor.

To test the improvement of the RC performance, we start with a clean network. In our test case, we used a commercial product, Apposite Netropy® 10G from Apposite Technologies LLC of Los Angeles, Calif., to configure a network link of 500 Mbps bandwidth and 20 ms propagation delay.

We created initial congestion by starting a transfer with a target rate five times larger than physical bandwidth, 2.5 Gbps. The target rate is a user-provided rate that FASP attempts. For this target rate setting, our protocol assigns 5 ms as the target queueing delay. When the demand exceeds the available bandwidth, FASP RC adjusts the rate towards the bandwidth as the network queue grows higher than the target queue. The product of the target queue and target rate determines the equilibrium, which is equivalent to the utility function in FAST TCP. Quantitatively, the transmission rate r, queueing delay q, target rate R, target queue Q and bandwidth B should satisfy QR=qr and r=B at the equilibrium. In this scenario, the transmission rate should approach the available bandwidth, and the queueing delay is expected to be five times the target queue, 25 ms at equilibrium.

In FIGS. 3A-3B, we show an example of the performance comparison by plotting the transmission rate and the RTT as a function of time for a system without a predictor. FIGS. 3C-3D show an example of the performance comparison by plotting the transmission rate and the RTT as a function of time for a system with Bezier predictor according to an embodiment of the present invention. Receiving rate approaches the physical bandwidth limit whether or not the RTT predictor is engaged. The average throughputs are 483 Mbps for the original FASP as shown in FIG. 3A and 493 Mbps for the system with Bezier predictor, according to an embodiment of the present invention and as shown in FIG. 3C. However, due to the feedback delay, without the predictor, the RC fails to converge to the theoretical equilibrium 500 Mbps (although the real equilibrium value can be slightly lower due to the protocol overhead). Instead, the transmission rate oscillates near the 500 Mbps, periodically overdrive and underdrive the network, which averages down to 483 Mpbs throughput as shown in FIG. 3A. The fluctuations of RTT range from 20 ms to 100 ms as shown in FIG. 3B. Consequently, the average queueing delay is up to 40 ms, nearly double the theoretical value.

In contrast, as shown in FIGS. 3C-3D, the transmission rate converges to the desired equilibrium very quickly and stays stable when the RTT-predictor is used. The fluctuation of RTT is reduced to less than 10 ms without any noticeable oscillation. The average queue is reduced to 24.8 ms as shown in FIG. 3F, confirming the functionality of the method.

The median absolute deviation (MAD) of rate and queue is calculated and shown in Table 1 of the median absolute deviation of the transmission rate and RTT. This is a more accurate measurement of the stability compared to the standard deviation because it is more resilient to outliers. The results show that the oscillatory behavior of the transfer is largely reduced when RTT predictor is engaged.

TABLE 1

| MAD | Rate (Mbps) | RTT (ms) |
| --- | --- | --- |
| None | 102.9 | 27.4 |
| FD31 | 2.2 | 0.8 |
| Bezier | 1.7 | 0.6 |
| ETS | 2.7 | 1.0 |

Figure 4A:
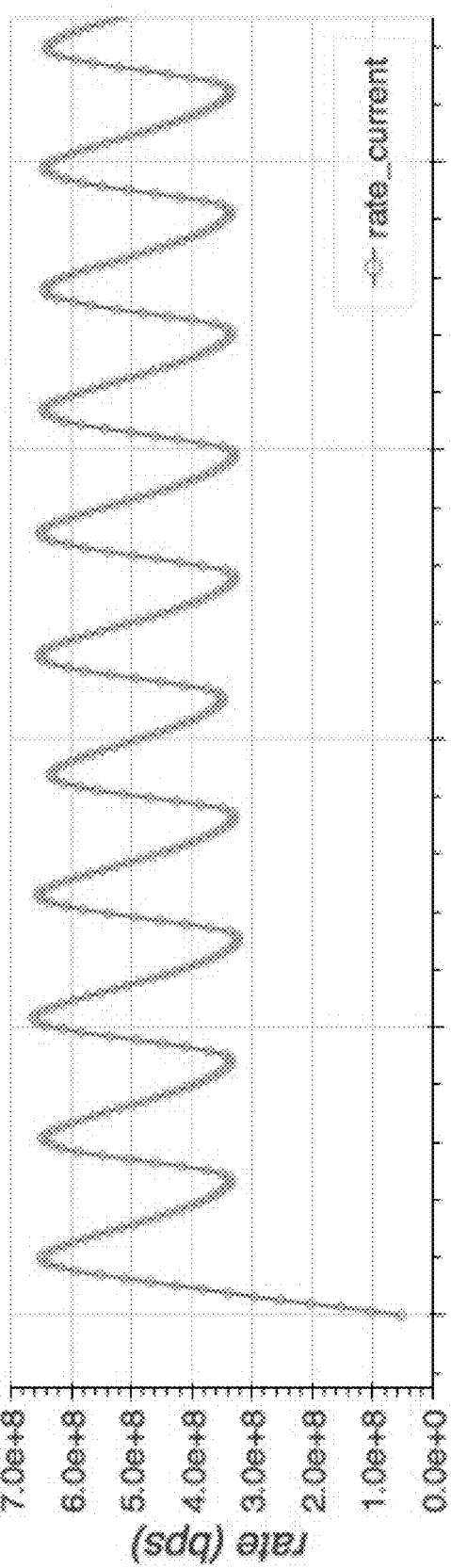
FIG. 4A shows a graph of rate (bps) versus time (s) indicating current transfer rate performance in a network with no predictor.
Figure 4B:
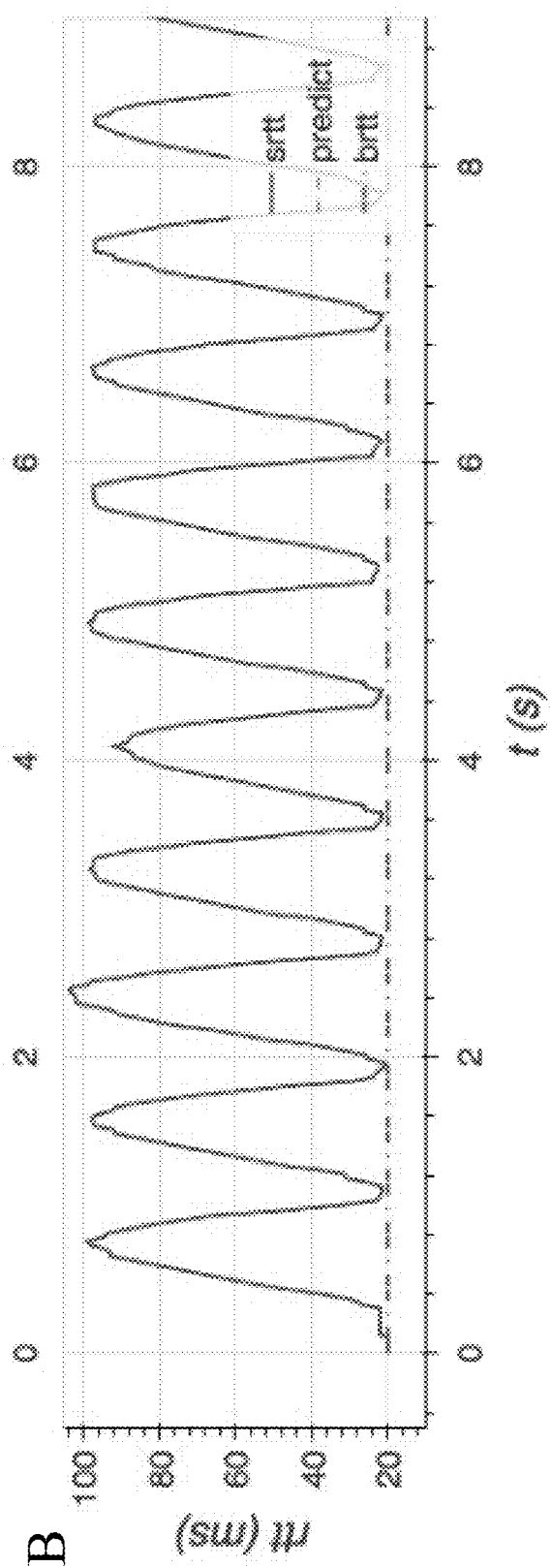
FIG. 4B shows a graph of RTT (ms) versus time (s) indicating transfer performance near equilibrium in a network with no predictor.

To explore the behavior of the RC in more detail, data is plotted from every rate update for transfers with each RTT predictors in FIG. 4C-4H. FIGS. 4A-4B show the behavior of the RC without a predictor. As in FIG. 3D-3F, the transmission rate converges to the 500 Mbps, and the queue converges to 25 ms when the RTT-predictors are enabled. All transfers that use the RTT-predictors, as shown in FIGS. 4C-4H are more stable and impose less persistent queueing delay than the original RC as shown in FIGS. 4A-4B.

Figure 4E:
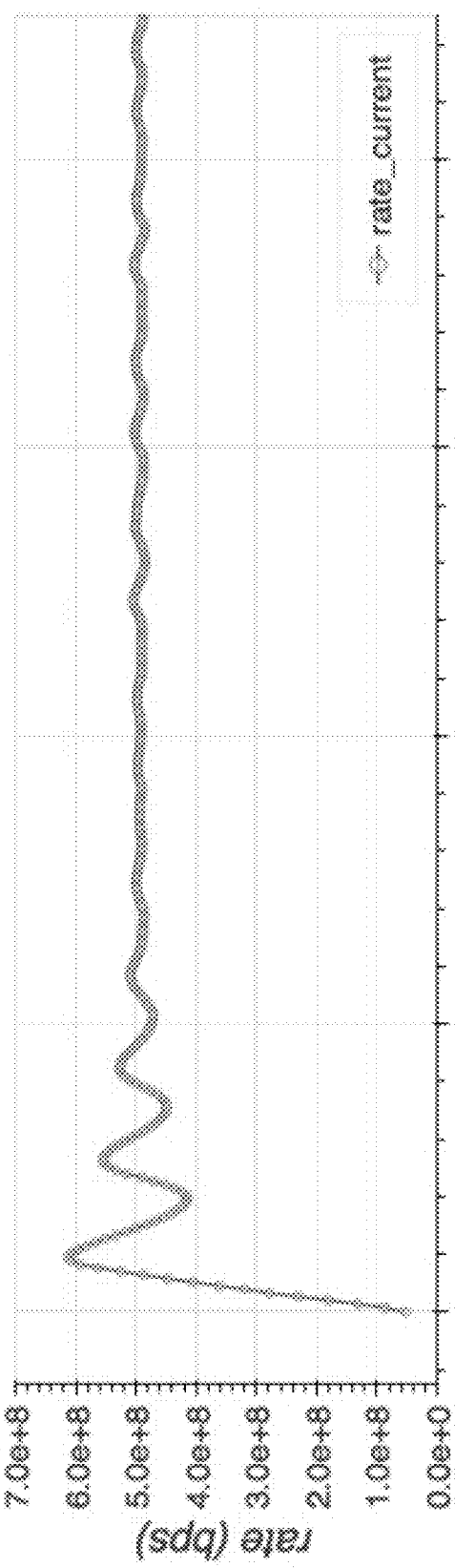
FIG. 4E shows a graph of rate (bps) versus time (s) indicating current transfer rate performance in a network with an ETS predictor.
Figure 4F:
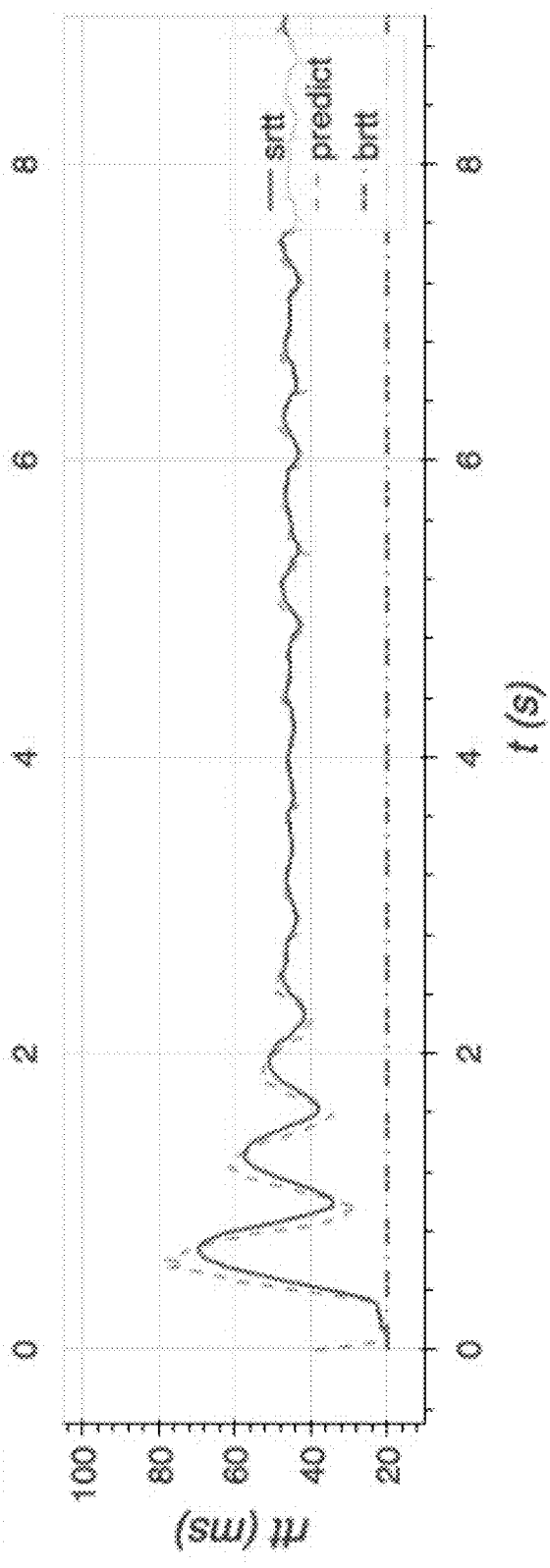
FIG. 4F shows a graph of RTT (ms) versus time (s) indicating transfer performance near equilibrium in a network with an ETS predictor.
Figure 4G:
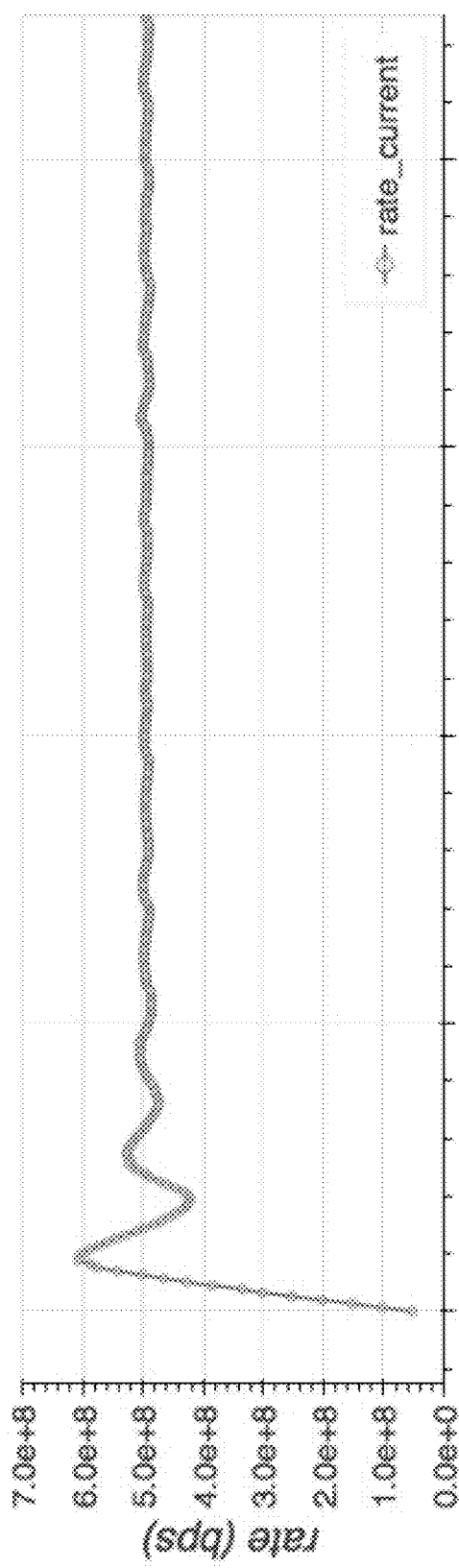
FIG. 4G shows a graph of rate (bps) versus time (s) indicating current transfer rate performance in a network with an FD31 predictor.
Figure 4H:
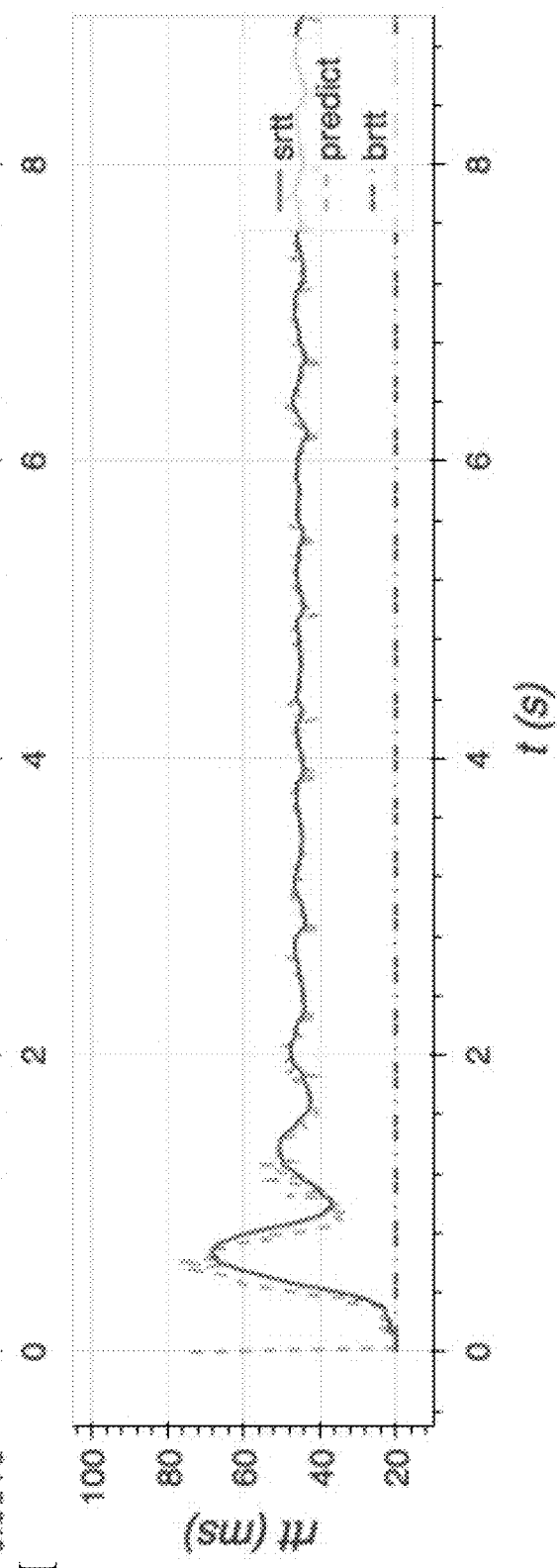
FIG. 4H shows a graph of RTT (ms) versus time (s) indicating transfer performance near equilibrium in a network with an FD31 predictor.

Our RTT prediction method shows robust performance improvement. As indicated in Eq. (1.6), the measurement and the instantaneous queue should resemble each other by a time-dependent time shift. Referring to FIGS. 4D, 4F, 4H, the predicted RTT (dashed line) curves overshoot and exaggerate the local trend compared to the measured sRTT (solid), especially at the local turning points. For example, the Bezier and FD31 predictors produced prominent noise-like local spike as shown by the dashed line in FIGS. 4F, and 4H. The occurrence of these prediction artifacts does not destabilize the transfer from equilibrium. In this respect, the ETS model, as shown in FIGS. 4E, 4F, produces relatively smooth prediction visually. However, the ETS model is the least responsive of the predictors, which leads to slower convergence and greater oscillation indicated in Table 1. bRTT is shown in the figures as the line with boxes.

Flow-Based Simulation

A single flow simulation program is implemented to optimize internal parameters for an embodiment of the present invention. In a method of FASP Single Flow, the following equations are used in executing the method.

$$q(t) = \frac{r(t) - B(t)}{B(t)}, \, q(t) > 0 \tag{1.14}$$

Where r(t) is the sending rate and B(t) is the network bandwidth.

The measured q̃(t) and the instantaneous q(t) follow the delay-relation and uses the following equations:

$$q(t) = \tilde{q}\left(t + \frac{b}{2} + q(t)\right) \tag{1.15}$$

$$\tilde{q}(t) = q\left(t - \frac{b}{2} - \tilde{q}(t)\right)$$

Note that neither Equation (1.13) nor Equation (1.14) depend on the rate-controller algorithm itself. Hence, the equations apply to general networks on the premise that there is no packet loss or distorted queueing by, for example, traffic policing and automatic repeat request (ARQ).

Since only the measurement of queueing is available, we represent any advancement in time of $\tilde{q}(t+\tau)$ in terms of $q(t)$ and rewrite Equation (1.13) in the integral form:

$$\tilde{q}(t+\tau) - \tilde{q}(t) = q\left(t + \tau - \frac{b}{2} - \tilde{q}(t+\tau)\right) - q\left(t - \frac{b}{2} - \tilde{q}(t)\right) = \int_{t-\frac{b}{2}-\tilde{q}(t)}^{t+\tau-\frac{b}{2}-\tilde{q}(t+\tau)} \frac{r(t') - B(t')}{B(t')} dt' \quad (1.16)$$

This is a non-linear integral equation, which is typically not solvable analytically. Because network traffic is inconsistent and, in many cases, poorly represented by continuous functions, typical numerical methods for solving differential equations are not preferred because they can be prone to numerical errors. However, within each rate-update interval, the sending rate is a constant. If we further assume the bandwidth is stable during an interval τ, which is most likely to be about tens of millisecond, then we can solve Equation (1.15) one step at a time and propagate throughout the desired range through iteration.

To clarify the notation, $t_i$ is defined as the current time, when the new $r_i$ is calculated at the receiver side. This rate $r_i$ will be applied at $t_i+b/2$ at the sender side. The next update $t_i$ can be represented as:

$$\tilde{q}(t_{i+1}) = \tilde{q}(t_i) + \int_{t_i-\frac{b}{2}-\tilde{q}(t_i)}^{t_{i+1}-\frac{b}{2}-\tilde{q}(t_i)} \frac{r(t') - B(t')}{B(t')} dt' \quad (1.17)$$

Step 1: Assume several interval $t_l$ and $t_k$; before the current time $t_i$, satisfy the inequality below:

$$t_{i-k} + \frac{b}{2} \le t_i - \frac{b}{2} - \tilde{q}_i \le \dots \ t_{i-1} + \frac{b}{2} \le t_{i+1} - \frac{b}{2} - \tilde{q}_{i+1} < t_{i-l+1} + \frac{b}{2} \quad (1.18)$$

Using the shorthand notation for Equation (1.17)

$$\eta(t) = \frac{r(t) - B}{B} \quad (1.19)$$

$$\eta\left(t_{i-k} + \frac{b}{2}\right) = \eta_{i-k}$$

$$\tilde{q}(t_i) = \tilde{q}_i$$

Then find k:

$$\frac{b}{2} + t_{i-k} \le t_i - \frac{b}{2} - \tilde{q}_i \quad (1.20)$$

$$\Rightarrow k = \text{ceiling}\left(\frac{b + \tilde{q}_i}{\tau}\right)$$

Step 2: Let l=k and evaluate Equation (1.16)

$$\tilde{q}_{i+1} - \tilde{q}_i = \int_{t_i-\frac{b}{2}-\tilde{q}_i}^{t_{i-k+1}+\frac{b}{2}} + \int_{t_{i-k+1}+\frac{b}{2}}^{t_{i-k+2}+\frac{b}{2}} \dots + \int_{t_{i-1}+\frac{b}{2}}^{t_{i+1}-\frac{b}{2}-\tilde{q}_{i+1}} \eta(t')dt' = \quad (1.21)$$

$$\tau(\eta_{i-k} + \eta_{i-k+1} \dots + \eta_{i-l}) + b(\eta_{i-k} - \eta_{i-1}) +$$

$$\tau(l\eta_{i-l} - k\eta_{i-k}) + \tilde{q}_i\eta_{i-k} - \tilde{q}_{i+1}\eta_{i-l}$$

This yields the explicit from to evaluate $\tilde{q}_{i+1}$:

$$\tilde{q}_{i+1} = \frac{1}{1 - \eta_{i-l}} \quad (1.22)$$

$$\left(\tilde{q}_{i-l}(1 + \eta_{i-k}) + \tau \sum_{m=k}^{l} \eta_{i-m} + b(\eta_{i-k} - \eta_{i-1}) + \tau(l\eta_{i-1} - k\eta_{i-k})\right)$$

(1.22)

Additionally, we let $\tilde{q} \ge 0$ to satisfy the physical constraint.

Step 3: Test if $\tilde{q}_{i+1}$ satisfies Equation (1.17), $$t_{i+1} - \frac{b}{2} - \tilde{q}_{i+1} < t_{i-l+1} + \frac{b}{2} \Rightarrow l < \frac{b + \tilde{q}_{i+1}}{\tau} \quad (1.23)$$

If Equation (1.22) is invalid, then l=l−1 and repeat step 2 with new l value.

Given any initial condition $r_0$, $q_0$, one can propagate the states to any later instance without numerical difficulties.

The implementation of the algorithm above is mostly straightforward. The sRTT prediction has been added to test the performance difference by enabling or disabling features. This procedure requires historical data of the states, which is allocated dynamically. We use the vector notation to represent the dynamical history data:

$$\vec{r}_i = \{\dots r_{i-k} \dots, r_i\}$$

$$\vec{q}_i = \{\dots q_{i-k} \dots, q_i\} \quad (1.24)$$

Where $\vec{r}_i$ and $\vec{q}_i$ are calculated data rate and measured queueing delay history before the instance $t_1$.

In each update period, the pseudo code of simulation is as below:

$$q_{i+1} = \text{update}(\vec{q}_i, \vec{r}_i)$$

$$q'_{i+1} = \text{predict}(\vec{q}_{i+1})$$

$$r_{i+1} = \text{calculate\_rate}(r_i, q_{i+1}') \quad (1.25)$$

Where the "update" step follows the procedure described in Eq. (1.16)-(1.22), the "predict" step follows one of the prediction methods descripted in Eq. (1.7)-(1.12) and "calculate_rate" step use Eq. (1.13).

Additional Embodiments

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of optimizing data transfer in a delay-based congestion control system between a sender computer and a receiver computer across a packet-switched network at a data rate, comprising the steps of:
    measuring a sequence of round-trip times for a plurality of packets exchanged between the sender computer and the receiver computer;
    calculating a filtered round-trip time sequence by applying an alpha-beta filter to the plurality of measured round-trip times;

calculating a future round-trip time using a round-trip time predictor based on a recent history of filtered round-trip time sequences; and sending the future round-trip time to a delay-based rate control unit and adjusting the data rate in accordance with the future round-trip time.

2. The method of claim 1, in which the predictor is selected from the group consisting of a first-order finite-difference method with three points rule, quadratic Bezier extrapolation, and an error-trend-seasonality model.

3. The method of claim 2, further comprising the step of applying a prediction range limiter to the first-order finite-difference method with three points rule and quadratic Bezier extrapolation.

4. The method of claim 1, wherein the alpha-beta filter is in an iterative form and uses a latest round-trip time for each iteration.

5. The method of claim 1, wherein a current filtered round-trip time is determined by the alpha-beta filter by the steps of:
evaluating a tracking index A in terms of an estimated system error, a measure noise error and packet incoming interval;
evaluating alpha and beta smoothing factors using a Kalata relationship;
estimating an expected round-trip time using the current filtered round-trip time (sRTT) and its derivative for each incoming packet update;
correcting a linear prediction by compounding the linear prediction using alpha and beta smoothing factors; and
estimating a smoothed signal and its derivative for each filtered round-trip time.

6. The method of claim 1, wherein the alpha-beta filter estimates a smoothed signal and its derivative.

7. A computer program product for optimizing data transfer between a sender computer and a receiver computer across a packet-switched network at a data rate, the receiver computer and the sender computer each comprising at least one processor, one or more memories, one or more computer readable storage media, the computer program product comprising a computer readable storage medium having program instructions embodied therewith, the program instructions executable by the sender computer to perform a method comprising:
measuring, by the sender computer, a sequence of round-trip times for a plurality of
packets exchanged between the sender computer and the receiver computer;
calculating, by the sender computer, a filtered round-trip time sequence by applying an alpha-beta filter to the plurality of measured round-trip times;
calculating, by the sender computer, a future round-trip time using a round-trip time predictor based on a recent history of filtered round-trip time sequences; and
sending, by the sender computer, the future round-trip time to a delay-based rate control unit and adjusting the data rate in accordance with the future round-trip time.

8. The computer program product of claim 7, in which the predictor is selected from the group consisting of a first-order finite-difference method with three points rule, quadratic Bezier extrapolation, and an error-trend-seasonality model.

9. The computer program product of claim 8, further comprising the program instructions of applying a prediction range limiter to the first-order finite-difference method with three points rule and quadratic Bezier extrapolation.

10. The computer program product of claim 7, wherein the alpha-beta filter is in an iterative form and uses a latest round-trip time for each iteration.

11. The computer program product of claim 7, wherein a current round-trip filtered time value is determined by the alpha-beta filter by the program instructions of:
evaluating a tracking index A in terms of an estimated system error, a measure noise error and packet incoming interval;
evaluating alpha and beta smoothing factors using a Kalata relationship;
estimating an expected round-trip time using the current filtered round-trip time (sRTT) and its derivative for each incoming packet update;
correcting a linear prediction by compounding the linear prediction using alpha and beta smoothing factors; and
estimating a smoothed signal and its derivative for each filtered round-trip time.

12. The computer program product of claim 7, wherein the alpha-beta filter estimates a smoothed signal and its derivative.

13. A computer system for optimizing data transfer between a sender computer and a receiver computer across a packet-switched network at a data rate, the sender computer comprising at least one processor, one or more memories, one or more computer readable storage media having program instructions executable by the computer to perform the program instructions comprising:
measuring, by the sender computer, a sequence of round-trip times for a plurality of packets exchanged between the sender computer and the receiver computer;
calculating, by the sender computer, a filtered round-trip time sequence by applying an alpha-beta filter to the plurality of measured round-trip times;
calculating, by the sender computer, a future round-trip time using a round-trip time predictor based on a recent history of filtered round-trip time sequences; and
sending, by the sender computer, the future round-trip time to a delay-based rate control unit and adjusting the data rate in accordance with the future round-trip time.

14. The computer system of claim 13, in which the predictor is selected from the group consisting of a first-order finite-difference method with three points rule, quadratic Bezier extrapolation, and an error-trend-seasonality model.

15. The computer system of claim 14, further comprising the program instructions of applying a prediction range limiter to the first-order finite-difference method with three points rule and quadratic Bezier extrapolation.

16. The computer system of claim 13, wherein the alpha-beta filter is in an iterative form and uses a latest round-trip time for each iteration.

17. The computer system of claim 13, wherein a current round-trip time value is determined by the alpha-beta filter by the program instructions of:
evaluating a tracking index A in terms of an estimated system error, a measure noise error and packet incoming interval;
evaluating alpha and beta smoothing factors using a Kalata relationship;
estimating an expected round-trip time using the current filtered round-trip time (sRTT) and its derivative for each incoming packet update;
correcting a linear prediction by compounding the linear prediction using alpha and beta smoothing factors; and
estimating a smoothed signal and its derivative for each filtered round-trip time.

18. The computer system of claim 13, wherein the alpha-beta filter estimates a smoothed signal and its derivative.

* * * * *